United States Patent
DeKock et al.

(12)

(10) Patent No.: US 6,279,969 B1
(45) Date of Patent: Aug. 28, 2001

(54) GAS PRESSURE REGULATOR COUPLING ARRANGEMENT

(75) Inventors: Wayne L. DeKock; Timothy J. Stewart, both of Nebraska City, NE (US)

(73) Assignee: American Meter Company, Horsham, PA (US)

( * ) Notice: Subject to any disclaimer, the term of this patent is extended or adjusted under 35 U.S.C. 154(b) by 0 days.

(21) Appl. No.: 09/247,128

(22) Filed: Feb. 9, 1999

(51) Int. Cl.[7] .............................. F16L 23/00; F16L 37/00
(52) U.S. Cl. .......................... 285/405; 285/368; 285/205; 285/30
(58) Field of Search .................................. 285/368, 205, 285/405, 30

(56) References Cited

U.S. PATENT DOCUMENTS

| | | |
|---|---|---|
| 198,818 | 1/1878 | Shaw . |
| 817,058 | 4/1906 | Greenfield . |
| 1,752,631 * | 4/1930 | Campbell .......................... 285/368 |
| 1,796,063 | 3/1931 | Swanson . |
| 3,202,063 | 8/1965 | Bissell et al. ........................ 92/91 |
| 3,542,403 * | 11/1970 | Douglas ............................... 285/30 |
| 3,727,955 | 4/1973 | Carter ................................. 385/223 |
| 3,946,754 * | 3/1976 | Cook .................................... 285/30 |
| 4,428,603 | 1/1984 | Davlin ................................ 285/368 |
| 4,795,166 * | 1/1989 | Irmler ................................. 285/368 |
| 4,919,391 | 4/1990 | Kemp ................................. 251/148 |
| 5,236,228 * | 8/1993 | Lawton ................................ 285/30 |
| 5,388,865 | 2/1995 | Hawkins .............................. 285/89 |
| 5,567,875 * | 10/1996 | Adams ................................. 285/30 |
| 5,853,201 * | 12/1998 | Izumi et al. ......................... 285/205 |

* cited by examiner

Primary Examiner—Eric K. Nicholson
(74) Attorney, Agent, or Firm—David L. Davis

(57) ABSTRACT

A mounting adaptor for coupling a gas pressure regulator outlet to a gas meter inlet includes a plate having through-bores alignable with internally threaded blind holes which surround the meter inlet in the meter wall. The plate has a planar surface surrounding the outlet opening of the regulator and is adapted for contact engagement with a planar surface on the meter exterior wall surrounding the inlet opening. A groove in the planar surface of the plate holds a sealing ring to effect a seal. In an alternate construction, a tube extends from the plate into the meter inlet opening and an annular groove on the tube exterior holds a sealing ring for engagement with a cylindrical wall extending into the meter from the inlet opening.

6 Claims, 4 Drawing Sheets

GAS PRESSURE REGULATOR COUPLING ARRANGEMENT

BACKGROUND OF THE INVENTION

This invention relates to gas pressure regulators and, more particularly, to an improved arrangement for coupling a gas pressure regulator to an inlet of a gas meter.

Gas meters commonly have a threaded insert providing an inlet at the top of the meter and the gas supply comes from the ground below the meter. Thus, a vertical pipe extends upwardly from the ground and is connected to the inlet of a gas pressure regulator. The outlet of the regulator is then commonly coupled to the meter inlet threaded insert through a nipple, an elbow, a further nipple which is horizontal, another elbow, and a swivel. It is apparent that all of the parts between the regulator and the meter add cost to the meter installation. It would therefore be desirable to be able to eliminate these parts to attain a cost reduction.

SUMMARY OF THE INVENTION

In accordance with the present invention, there is provided an improved arrangement for coupling the outlet of a gas pressure regulator or the like to an inlet of a gas meter for fluid communication therebetween. The inventive arrangement includes a planar surface on an exterior wall of the meter. The planar surface surrounds an inlet opening of the meter and the exterior wall includes a plurality of internally threaded blind holes extending into the exterior wall from the planar surface. A plate having a planar surface adapted for contact engagement with the exterior wall planar surface is also provided. The plate has an opening surrounded by the plate planar surface. The plate opening is adapted for alignment with the meter inlet opening when the plate planar surface is in contact engagement with the exterior wall planar surface. The plate further has a plurality of through-bores, each adapted for alignment with a respective one of the plurality of blind holes when the plate opening is aligned with the meter inlet opening. Piping is secured to the plate and is effective to connect in fluid communication the gas pressure regulator outlet with the plate opening.

In accordance with an aspect of this invention, the coupling arrangement further includes a resilient sealing ring and the plate planar surface is formed with a continuous closed groove surrounding the plate opening for accommodating the sealing ring therein. Accordingly, the sealing ring provides a seal around the aligned meter inlet and plate openings when the plate planar surface is in contact engagement with the exterior wall planar surface.

In accordance with another aspect of this invention, the piping comprises a threaded nipple.

In accordance with yet another aspect of this invention, the piping and the plate are formed integrally as part of the outlet pipe of the regulator.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
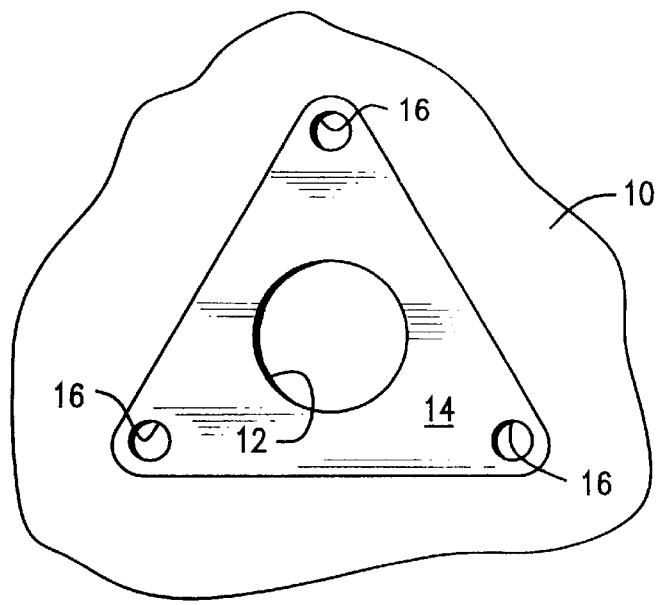
FIG. 1 is a partial plan view of a meter exterior wall in the vicinity of the meter inlet.
Figure 5:
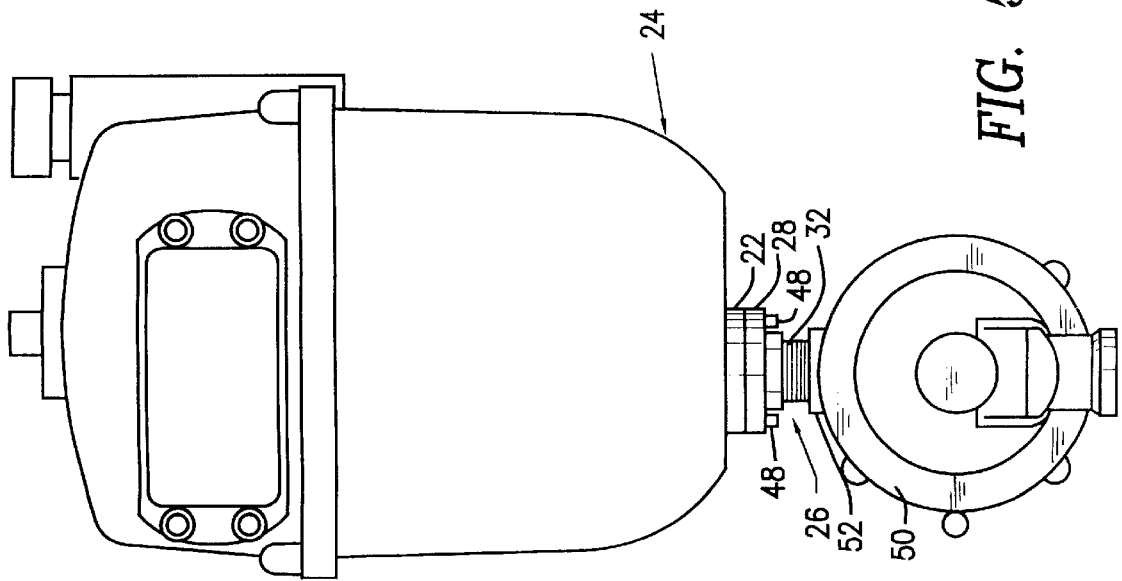
FIG. 5 is a front view showing a straight through regulator coupled to a meter inlet on the bottom of the meter by means of the adaptor shown in FIG. 2.
Figure 4:
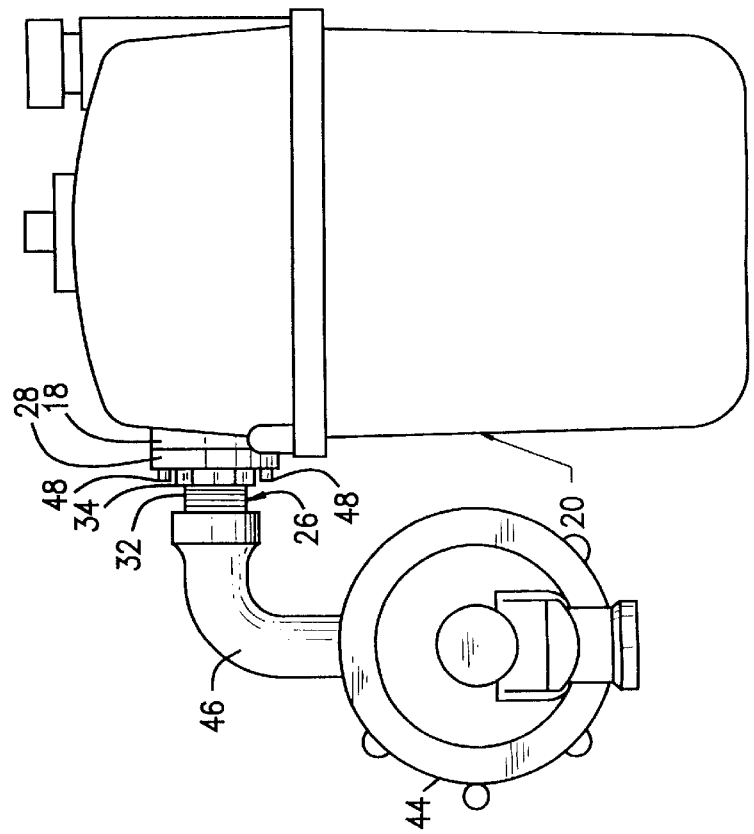
FIG. 4 is a front view showing a 90° regulator coupled to a meter inlet on the side of the meter by means of the adaptor shown in FIG. 2.
Figure 7:
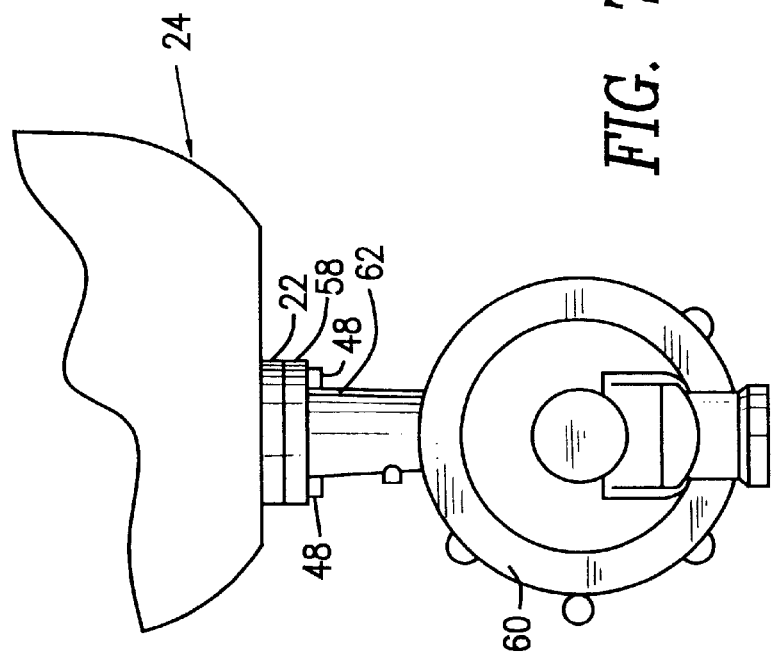
FIG. 7 is a partial front view of a gas meter showing a straight through regulator with an integral mounting adaptor mounted to a bottom of the meter.
Figure 6:
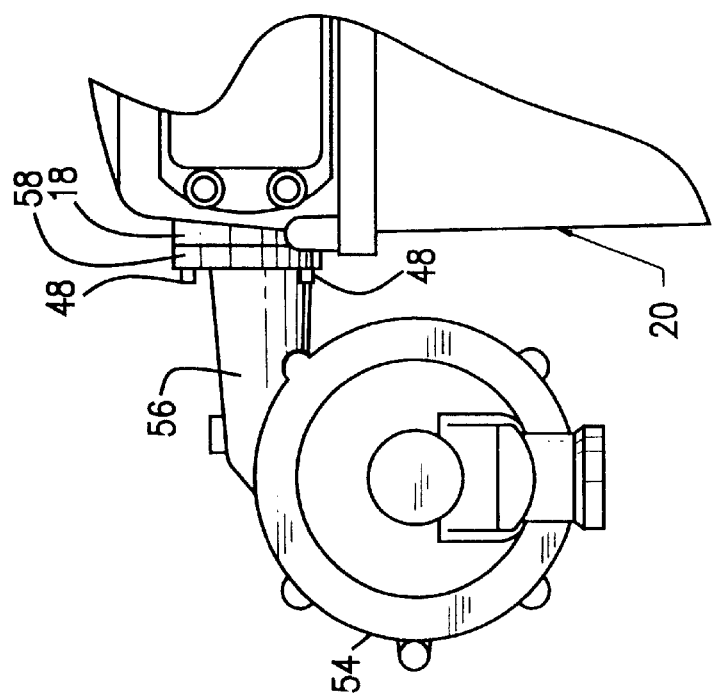
FIG. 6 is a partial front view of a gas meter showing a 90° regulator with an integral mounting adaptor mounted to a side of the meter.

Referring now to the drawings, FIG. 1 shows a portion of an exterior wall 10 of a gas meter having an opening 12 functioning as the inlet opening of the meter. Surrounding the inlet opening 12 is a planar surface 14 formed as part of the exterior wall 10, illustratively substantially triangular in peripheral configuration and raised with respect to the wall 10. Adjacent each vertex of the triangular area defined by the planar surface 14, is a respective internally threaded blind hole 16 extending into the exterior wall 10 from the surface 14. As shown in FIGS. 4 and 6, the planar surface 14 can be on a boss 18 formed on a side wall of a gas meter 20 or, as shown in FIGS. 5 and 7, the planar surface 14 can be on a boss 22 formed on the bottom wall of a meter 24.

Figure 2:
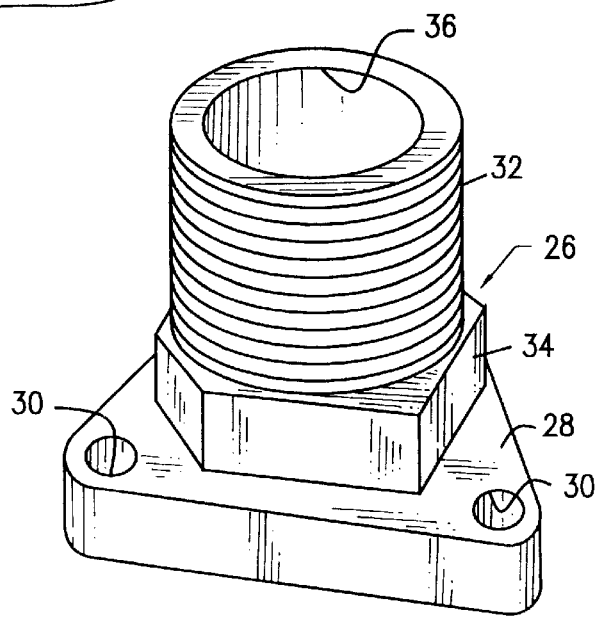
FIG. 2 is a perspective view of a first embodiment of a portion of the present invention showing an adaptor including a plate and piping.
Figure 3:
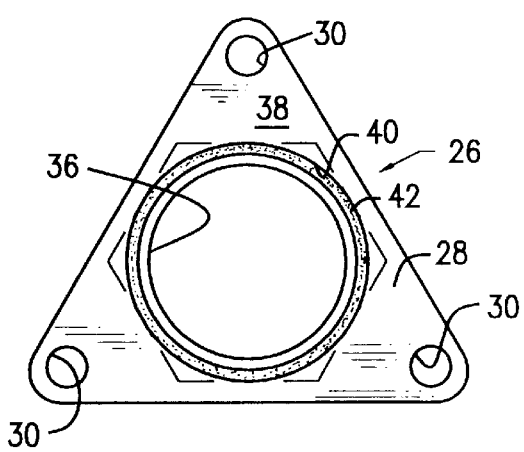
FIG. 3 is plan view of the planar surface of a plate according to the present invention.

FIG. 2 illustrates a first embodiment of an inventive adaptor 26 for coupling the outlet of a gas pressure regulator to the inlet opening,12. The adaptor 26 includes a plate 28 of peripheral configuration substantially congruent with the peripheral configuration of the planar surface 14. Thus, the plate 28 is substantially triangular along its periphery and is formed with a plurality of through-bores 30 each adjacent a respective vertex of its triangular shape, as best seen in FIG. 3. The through-bores 30 are alignable with the blind holes 16 of the exterior wall 10. Secured to the plate 28, preferably by being formed integrally therewith, is a threaded nipple 32. Between the nipple 32 and the plate 28 is a polygonal-sided gripping member, preferably a hexagonal bolt head, 34. An opening 36 extends through the nipple 32, the bolt head 34 and the plate 28.

As best shown in FIG. 3, at the underside of the adaptor 26, the plate 28 has a planar surface 38 adapted for contact engagement with the planar surface 14. When such engagement is effected, the opening 36 is alignable with the opening 12 and the through-bores 30 are each alignable with a respective one of the blind holes 16, all such alignments occurring simultaneously. To effect a seal around the openings 12, 36, the planar surface 38 is formed with a continuous closed groove 40 surrounding the opening 36. The purpose of the groove 40 is to accommodate sealing ring 42 therein. The groove 40 illustratively has a circular configuration to accommodate the ring 42, which is illustratively an O-ring. ring. However, it is understood that other sealing rings can be utilized, such as, for example, a square cut ring. In addition, a seal may also be effected by the use of an alternative type of sealing component or by the application of a sealing compound.

FIG. 4 illustrates the use of the adaptor 26 with the meter 20 having a side inlet opening. In this configuration, since the gas supply originates from below, the gas pressure regulator 44 is a 90° regulator, i.e., its outlet is at 90° to its inlet. In this embodiment, the nipple 32 of the adaptor 26 is threaded into the outlet pipe 46, using a wrench gripping the bolt head 34. Bolts 48 are then inserted through the bores 30 of the plate 28 and are secured in the blind holes 16 of the boss 18.

As shown in FIG. 5, when the meter 24 has a bottom inlet, a straight through gas pressure regulator 50 is utilized. In this configuration, the adaptor 26 is secured to the outlet pipe 52 of the regulator 50 and the bolts 48 are used to secure the adaptor 26 and attached regulator 50 to the boss 22.

As an alternative to using a separate mounting adaptor piece 26, the adaptor may be formed integrally with the outlet pipe of the regulator. Thus, as shown in FIG. 6 for a 90° gas pressure regulator 54, the outlet pipe 56 is terminated by a flange 58 which is substantially identical to the plate 28 of the adaptor 26. Thus, like the plate 28, the flange 58 is formed with a planar surface and has a groove for accommodating the O-ring 42. Similarly, as shown in FIG. 7, a straight through regulator 60 has its outlet pipe 62 terminated by the flange 58.

Figure 8:
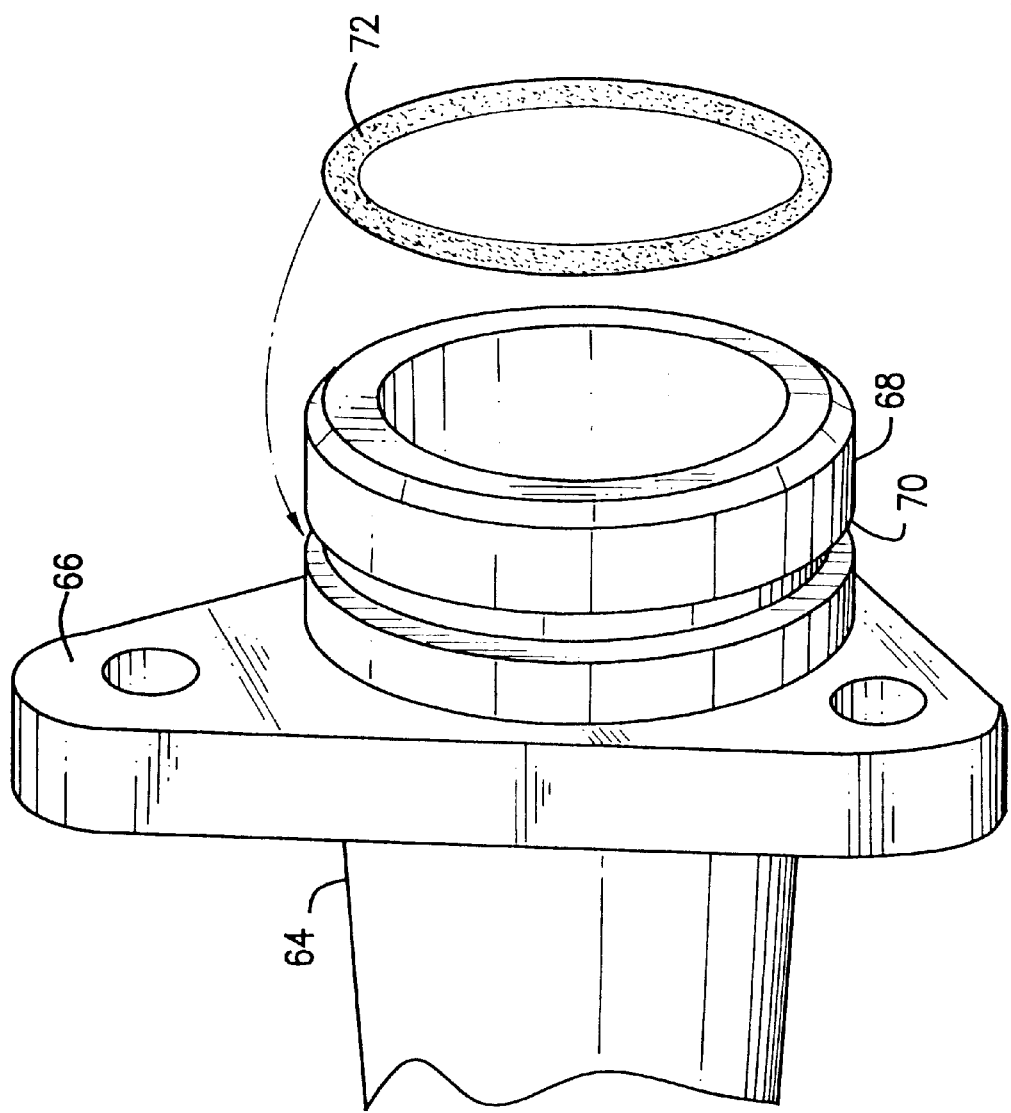
FIG. 8 is a partial perspective view showing a further embodiment of the present invention.

FIG. 8 illustrates a further alternate construction according to this invention wherein the outlet pipe 64 of the regulator is terminated by a flange 66 and a tube 68. The flange 66 is similar to the plate 28 of the adaptor 26 but does not have a groove for accommodating an O-ring. Instead, the outer surface of the tube 68 is formed with a circumferential groove 70 for accommodating therein an O-ring 72. When using the construction illustrated in FIG. 8, the meter includes, a cylindrical wall extending from the inlet opening into the meter interior. This cylindrical wall is sized to receive therein the tube 68, with the O-ring 72 effecting a tight seal between the tube 68 and the cylindrical wall. Although not shown, as an alternative to the construction illustrated in FIG. 8, a separate adaptor piece including the tube 68, the flange 66, and a nipple similar to the nipple 32, along with a gripping member 34, can also be utilized.

In the embodiments disclosed herein, the plates and flanges have been illustrated as being triangular in shape. It is understood that other shapes, such as rectangular and circular, for example, can also be utilized. Further, the connection to the meter has been shown as being on the left side or bottom of the meter. It will be appreciated that the present invention can be practiced in cooperation with an inlet opening on any of the sides of the meter.

Accordingly, there has been disclosed an improved arrangement for coupling the outlet of a gas pressure regulator to a gas meter inlet. While illustrative embodiments of the present invention have been disclosed herein, it is understood that various adaptations and modifications to the disclosed constructions are possible, and it is therefore intended that this invention be limited only by the scope of the appended claims.

What is claimed is:

1. In combination with a gas pressure regulator and a gas meter, an arrangement for coupling an outlet pipe of the gas pressure regulator to an inlet opening of the gas meter for fluid communication therebetween, wherein the gas meter inlet includes a cylindrical wall extending into the gas meter from the inlet opening, the arrangement comprising:

a planar surface on an exterior wall of the meter, the planar surface surrounding the inlet opening of the meter, said exterior wall including a plurality of internally threaded blind holes extending into said exterior wall from said planar surface;

a plate having a planar surface adapted for contact engagement with said exterior wall planar surface, said plate having an opening surrounded by said plate planar surface and adapted for alignment with said meter inlet opening when said plate planar surface is in contact engagement with said exterior wall planar surface, said plate further having a plurality of through-bores each adapted for alignment with a respective one of said plurality of blind holes when said plate opening is aligned with said meter inlet opening;

a cylindrical tube extending from the plate planar surface and adapted for insertion into the inlet opening, the tube having a circumferential groove on its outer surface; and a resilient sealing ring adapted for receipt in said groove;

wherein said plate is formed integrally as part of the outlet pipe of said regulator.

2. The arrangement according to claim 1 further comprising a plurality of headed bolts each adapted for insertion through a respective through-bore and into threaded engagement with a respective blind hole.

3. The arrangement according to claim 1 wherein there are three blind holes each defining a respective vertex of an equilateral triangle and said exterior wall planar surface has a generally triangular periphery with vertices each adjacent a respective blind hole.

4. The arrangement according to claim 3 wherein said plate planar surface has a generally triangular periphery with vertices each adjacent a respective through-bore.

5. The arrangement according to claim 1 wherein said meter exterior wall is a side wall of said meter.

6. The arrangement according to claim 1 wherein said meter exterior wall is the bottom wall of said meter.

* * * * *